United States Patent [19]

Conrad et al.

[11] Patent Number: 4,591,339
[45] Date of Patent: May 27, 1986

[54] DEVICE FOR TREATING OF WORK PIECES WITH AN EXPLOSIVE GAS MIXTURE

[75] Inventors: Hans-Jürgen Conrad, Rutesheim; Eberhard Pfeiffer, Reutlingen, both of Fed. Rep. of Germany

[73] Assignee: Robert Bosch GmbH, Stuttgart, Fed. Rep. of Germany

[21] Appl. No.: 700,876
[22] PCT Filed: Apr. 27, 1984
[86] PCT No.: PCT/DE84/00096
   § 371 Date: Jan. 10, 1985
   § 102(e) Date: Jan. 10, 1985
[87] PCT Pub. No.: WO84/04715
   PCT Pub. Date: Dec. 6, 1984

[30] Foreign Application Priority Data

May 20, 1983 [DE] Fed. Rep. of Germany ....... 3318426

[51] Int. Cl.⁴ .......... F27B 5/04; C21D 1/06; F23C 11/04; F27D 7/00
[52] U.S. Cl. .................... 432/205; 266/251; 431/1; 432/25
[58] Field of Search ....... 431/1; 432/25, 120, 432/205; 266/251

[56] References Cited

U.S. PATENT DOCUMENTS 4,487,576 12/1984 Martini .................. 432/25

Primary Examiner—John J. Camby
Attorney, Agent, or Firm—Michael J. Striker

[57] ABSTRACT

A device is suggested wherein the work piece finishing chamber (31) serves simultaneously as a mixing chamber for mixing the gas components, and wherein a gas deceleration stage (47) is integrated in chamber block (30) between chamber (31) and a spark plug (54). The gas deceleration stage (47) is provided with labyrinth like extending bores (49,50,51). The combustion residues generated in the work piece finishing chamber (31) cannot reach spark plug (54) in view of the gas deceleration stage (47). Thus, a contamination of the spark plug (54) being disposed in block (30) is substantially eliminated.

10 Claims, 2 Drawing Figures

DEVICE FOR TREATING OF WORK PIECES WITH AN EXPLOSIVE GAS MIXTURE

BACKGROUND OF THE INVENTION

The invention relates to a device a device for treating work pieces with an explosive gas mixture. In particular to a thermic deburring device. In such devices for thermic deburring of work pieces an unaimed removal occurs, whereby the total work piece is subjected to a heat shock. Preferably, corners and edges are removed since these locations absorb a lot of heat with a large surface and a small volume and are therefore oxidized or burned. The heat shock is generated by burning off a combustion gas-oxygen-mixture, whereby hydrogen, natural gas or methane is used as a combustible gas. The gas components are fed from a supply into one each dosaging cylinder and are pumped by means of a compressor under a considerable compression through valves into the work piece finishing chamber, whereby their admixing occurs in a mixing chamber. The compression of the gas components is uniformly large and corresponds towards the end of the filling in the work-piece finishing chamber to the pressure which is required for the given optimum combustion operation. The higher the combustion gas-oxygen-mixture has been compressed, the higher is the energy and the more severe is the deburring effect. The combustion temperature of the gas is in a range of 2500° C. to 3500° C. The heat amount released increases per volume unit with the increase of the pressure. The pressures generated in the work piece finishing chamber are about 40 bar when filling the chamber. During the explosion shortly after the ignition a pressure of about 700 bar is generated in the chamber. This short lived very high pressure stresses the construction parts of the mixing chamber which are connected to the work piece finishing chamber.

In a known device the mixing chamber is flanged onto the work piece finishing chamber as a structural part and contains, among other things a spark plug required for igniting the gas mixture. When igniting the gas mixture the explosion advances from the area of the spark plug in direction of the work piece finishing chamber. In the view of the high explosion pressure and the high combustion temperatures in the work piece finishing chamber the immediately connected mixing chamber is also subjected to very high stresses. In particular, a rapid contamination of the spark plug occurs which may result in a breakdown of the deburring device which operates in a cycle.

In order to avoid this a gas deceleration stage was mounted between the work piece finishing chamber and the gas mixing chamber with labyrinth or meander like extending lines. Thereby, the contaminations generated by the combustion pressure wave during deburring of work pieces in the work piece finishing chamber cannot reach the mixing chamber, but are caught in the lines of the gas deceleration stage.

In the known device the work piece finishing chamber, the gas mixing chamber and the gas deceleration stage are shaped as different blocks being flanged together. The material and manufacturing costs for these blocks are considerable, so that the purchase price of such an installation is rather high.

Summary of the Invention

The device in accordance with the invention and the present is advantageous in that the work piece finishing chamber also serves as the gas mixing chamber and that the gas deceleration stage is integrated into the work piece finishing chamber. Instead of three separare blocks the suggested device requires only one block for obtaining the same effects. Therefore, it can be made more cost effective and does not require much space in view of its compact structure in contrast to the afore-described known device. Furthermore, the suggested device permits shorter cycles during the finishing of the work pieces, since the gas components are already mixed in the work piece finishing chamber and penetrate from there through the lines of the gas deceleration stage into the ignition bore. The paths between the ignition device and the work piece finishing chamber are relatively short which has a positive effect on the operaton of the ignition.

In a further embodiment it is particularly advantageous to design the supply lines for the gas components and the labyrinth like lines for the gas deceleration stage in form of bores in the chamber block, preferably in its upper part.

BRIEF DESCRIPTION OF THE DRAWINGS

Further features of the invention can be seen from the following description in conjunction with one exemplified embodiment illustrated in the drawing.

DETAILED DESCRIPTION OF THE PREFERRED EMBODIMENTS

Figure 1:
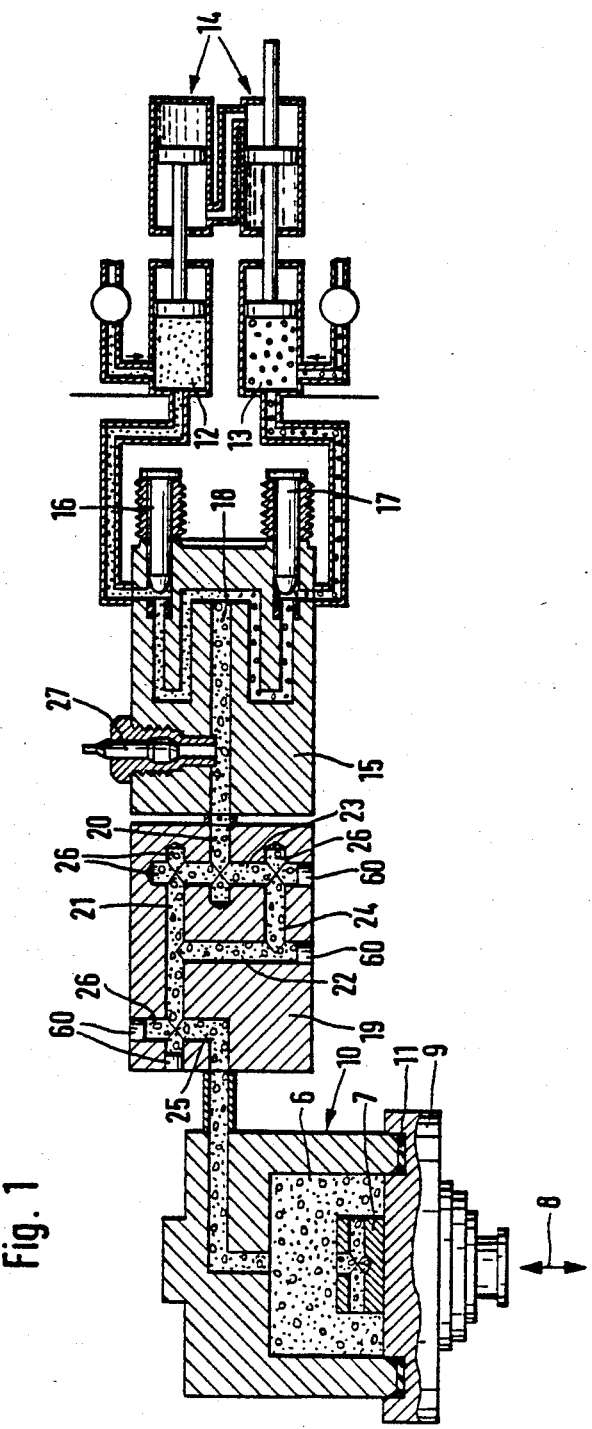
FIG. 1 shows a schematic illustration of a known device for a thermic deburring of work pieces.

FIG. 1 shows a finishing chamber 6 wherein the work piece 7 to be deburred is located. The work piece is mounted on a plate 9 which is movable in the direction of double arrow 8 and which is placed on the front face of a cylindrical block 10 contained in chamber 6 before initiating the deburring operation. A gasket 11 is provided between plate 10 and the front face.

The gas components of the combustion-oxygen-mixture are fed into the mixing chamber 15 by means of a dosaging cylinder 12 for combustion gas as well as a dosaging cylinder 13 for oxygen by means of a gas feeding device 14. Valves 16 and 17 for the combustion gas or the oxygen control the feeding of the gas components into mixing chamber 15. The admixing of the gas components occurs in a bore 18 of the mixing chamber 15.

The combustion gas-oxygen-mixture is pushed through the gas feeding device 14 from the mixing chamber 15 through the gas deceleration stage 19 into the work piece finishing chamber 6 and compressed to about 40 bar.

The gas deceleration stage 19 consists of a number of labyrinth like extending bores 20 to 24. Preferably, these bores are disposed in a rectangular manner with respect to each other. However, an oblique arrangement of the bores with respect to each other is also possible. The gas deceleration stage 19 is connected with the mixing chamber 15 by means of a gas inlet bore 20 and with the work piece finishing chamber 6 by means of of a gas discharge bore 25. Moreover, the bores are closed gas tight by means of plugs 60. The labyrinth like bores 20 to 24 in the gas deceleration stage 19 are so arranged that a blind hole 26 is provided after each bore crossing.

The gas deceleration stage 19 operates as follows: After the combustion gas-oxygen-mixture is present in the work piece finishing chamber 6 under the required pressure, the mixture is ignited in the mixing block 15 by means of the spark plug 27. The flame then advances through bore 20, through the labyrinth like bores 21 to 24 of the gas deceleration stage 19 and into the work piece finishing chamber 6. A pressure of up to 700 bar and temperatures in the area of 3500° C. are generated in the chamber during the explosion. Considerable combustion residues are generated during the deburring of the work piece 7 in view of the burning of the deburred material which are pushed into the gas deceleration stage 19 in the form of contaminants by the rebounding pressure wave. In view of the labyrinth like design of the gas deceleration stage 19 with a number of right angular extending bores and blind holes 26 the contaminants from the combustion chamber 10 are contained and do not reach the mixing chamber 15. This increases the service life of the spark plug 27 at least tenfold. Thus, erroneous ignitions are eliminated in the device which operates in a cycle. The operating safety is thereby considerably increased.

Figure 2:
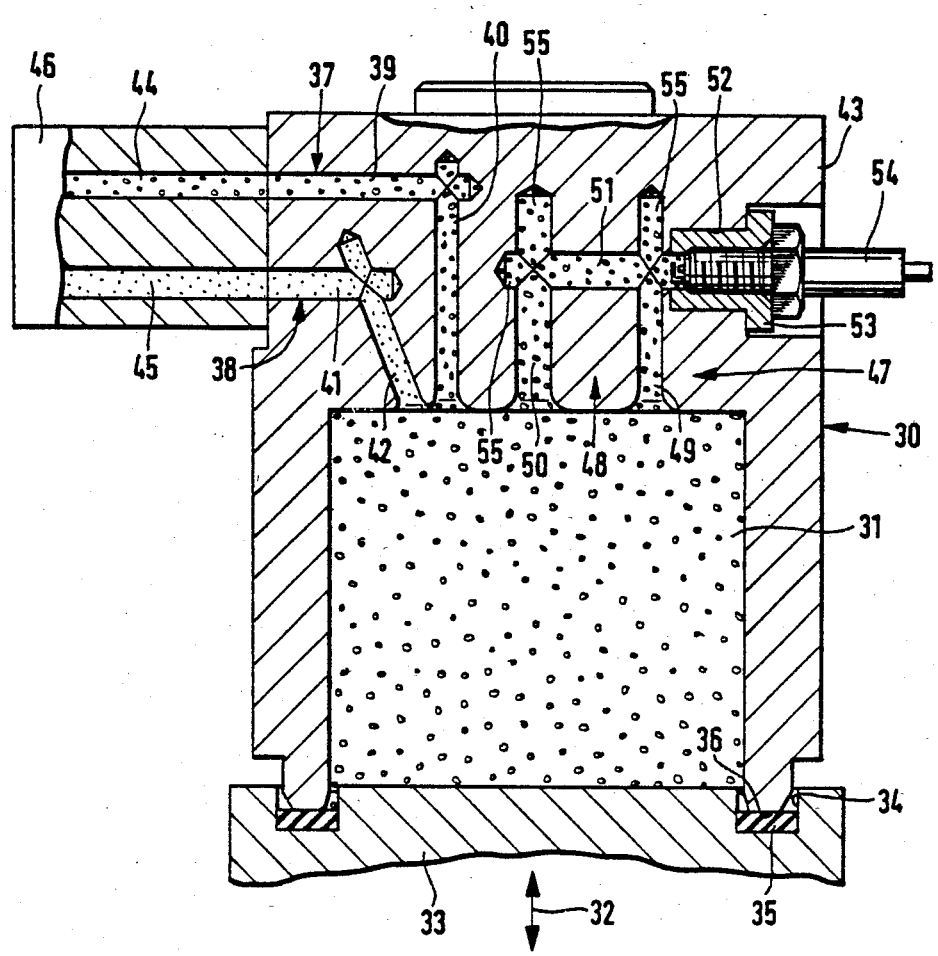
FIG. 2 shows the essential parts of a deburring device in accordance with the invention in a longitudinal section.

In contrast to the aforementioned described known device for thermic deburring the work piece finishing chamber, the gas-mixing chamber and the gas deceleration stage are mounted in one single block 30 in the device suggested in accordance with FIG. 2, whereby the block is cylindrical in shape. The work piece finishing chamber 31 is designed within the block. This chamber which is open at its bottom is gastight closable by a plate 33 which is movable in the direction of double arrow 32 which supports the work piece to be deburred, not shown. A gasket 35 is provided in an annular groove 34 of plate 33 which in the closed condition of the chamber engages on the front face 36 of block 30.

The work piece finishing chamber 31 simultaneously serves as the gas-mixing chamber. The feeding of the gas components is performed through two lines 37,38 which discharge into chamber 31 and which are designed in the exemplified embodiment in form of blind hold bores 39,40 or 41,42 in the upper part 43 of block 30. Bores 39,40 are arranged in a rectangular manner with respect to each other, while the bore 41 extends parallel to bore 39 and bore 42 obliquely with respect to bore 40, in such a manner that bores 40,42 discharge in chamber 31 in a tight adjacent manner with respect to each other. The bore 39 which feeds oxygen is continued by bore 44, while a bore 45 is disposed adjacent to bore 41 which contains the combustion gas. Bores 44,45 are designed in a block 46, wherein the valves controlling the gas inlet may also be mounted.

The gas deceleration stage 47 which is also mounted in the upper part 43 of block 30 consists of line system 48. The lines are designed as right angular disposed blind hole bores 49,50,51. The two parallel vertical bores 49,50 discharge into the work piece receiving chamber 31 and may have different cross sections as can be seen from FIG. 2. Bore 51 extends horizontally and connects bores 49,50 with each other. Bore 51 is provided with an expansion 52 at its end directed toward the outside of block 30 into which a thread casing 53 is inserted for receiving the spark plug 54.

Bores 49,50,51 of the gas deceleration stage are arranged in such a manner that a blind hole 55 is present after each bore crossing. The contaminants which are generated during the deburring process in the work piece receiving chamber 31 are caught in these blind holes 55 and are thus prevented from reaching spark plug 54. Therefore, the effect of the gas deceleration stage 47 corresponds to the one of the known device in accordance with FIG. 1, with the difference that the gas deceleration stage is mounted in a separate block, while the gas deceleration stage 47 of the suggested device is integrated in the work piece receiving and gas mixing block 30, which is favorable with respect to manufacturing costs and space requirement for the device.

Moreover, the labyrinth like extending bores may be kept relatively small, so that the thermic stress of the spark plug is kept low. With relatively small bores in the dimension of between 1 mm and 8 mm the penetration of contamination particles is simultaneously made more difficult.

The device, as illustrated in FIG. 2, is not only suitable for a thermic deburring of work pieces, but is also suitable for other fields of application. With such a device the process of reticulating of foam material in accordance with U.S. Pat. No. 3,175,025 or the process for removing of porous forms, for example, in accordance with U.S. Pat. No. 3,743,692 may be performed. There are many other fields of applications wherein work pieces are finished by means of an explosive gas mixture. The protection of the device in accordance with the invention naturally also extends to such further fields of application.

What is claimed is:

1. A device for treating work pieces with an explosive gas mixture, comprising: a chamber block defining a work piece finishing chamber; an ignition device mounted in said chamber block; a gas deceleration stage located within said block between and communicating with said work piece finishing chamber and said ignition device; and a plurality of feeding lines provided in said block so as to feed gas mixture compounds immediately into said work piece finishing chamber.

2. Device in accordance with claim 1, wherein said gas deceleration stage includes a line system with a plurality of meander-like extending lines.

3. A device for treating work pieces with an explosive gas mixture, comprising: a chamber block defining a work piece finishing chamber; an ignition device mounted in said chamber block; a gas deceleration stage located within said block between said work piece finishing chamber and said ignition device; and a plurality of feeding lines provided in said block so as to feed the gas mixture immediately into said work piece finishing chamber, said gas deceleration stage including a line system with a plurality of labyrinth-like extending lines communicating with said work piece finishing chamber and said ignition device.

4. Device in accordance with claim 3, wherein said plurality of extending lines of said line system of said gas deceleration stage includes a plurality of extending lines which discharge into said work piece finishing chamber and which are connected with each other by at least one transverse extending line.

5. Device in accordance with claim 4, wherein said transverse line extends outwardly; and further comprising a support provided in said transverse line for said ignition device.

6. Device in accordance with claim 5, wherein said feeding lines and said line system of said gas deceleration stage are formed as bores in said chamber block.

7. Device in accordance with claim 6, wherein said gas feeding lines and said line system of said gas deceleration stage formed as blind hole bores.

8. Device in accordance with claim 6, wherein said chamber block has an upper part, said feeding lines and said line system being formed as bores in said upper part of said chamber block.

9. Device in accordance with claim 1, wherein said feeding lines and said line system of said gas deceleration stage are formed as bores in said chamber block.

10. Device in accordance with claim 9, wherein said chamber block has an upper part, said feeding lines and said line system being formed as bores in said upper part of said chamber block.

* * * * *